United States Patent [19]

Donohue

[11] 3,932,291

[45] Jan. 13, 1976

[54] PREPARATION AND DOPING OF SEMICONDUCTING FORMS OF $CuAlS_2$

[75] Inventor: Paul C. Donohue, Wilmington, Del.

[73] Assignee: E. I. Du Pont de Nemours & Company, Wilmington, Del.

[22] Filed: Jan. 10, 1973

[21] Appl. No.: 322,359

[52] U.S. Cl. ........ 252/62.3 V; 252/62.3 T; 252/518; 252/301.4 S; 423/511
[51] Int. Cl.[2] .................. C04B 35/00; H01B 1/10
[58] Field of Search ..... 252/62.3 V, 62.3 R, 62.3 T, 252/301.4 S, 501, 518; 423/511

[56] References Cited
UNITED STATES PATENTS
2,814,004  11/1957  Goodman ........................... 148/176

OTHER PUBLICATIONS

Tell et al., "J. Appl. Phys.," Vol. 43, No. 5, 2469–2470 (1972).

Honeyman, "J. Phys. Chem. Solids," 30, 1935–1940 (1969).

Primary Examiner—Jack Cooper
Attorney, Agent, or Firm—Anthony P. Mentis

[57] ABSTRACT

New forms of copper aluminum sulfide are semiconductors. Depending on the amount of dopant present, they are either p-type or n-type.

6 Claims, 1 Drawing Figure

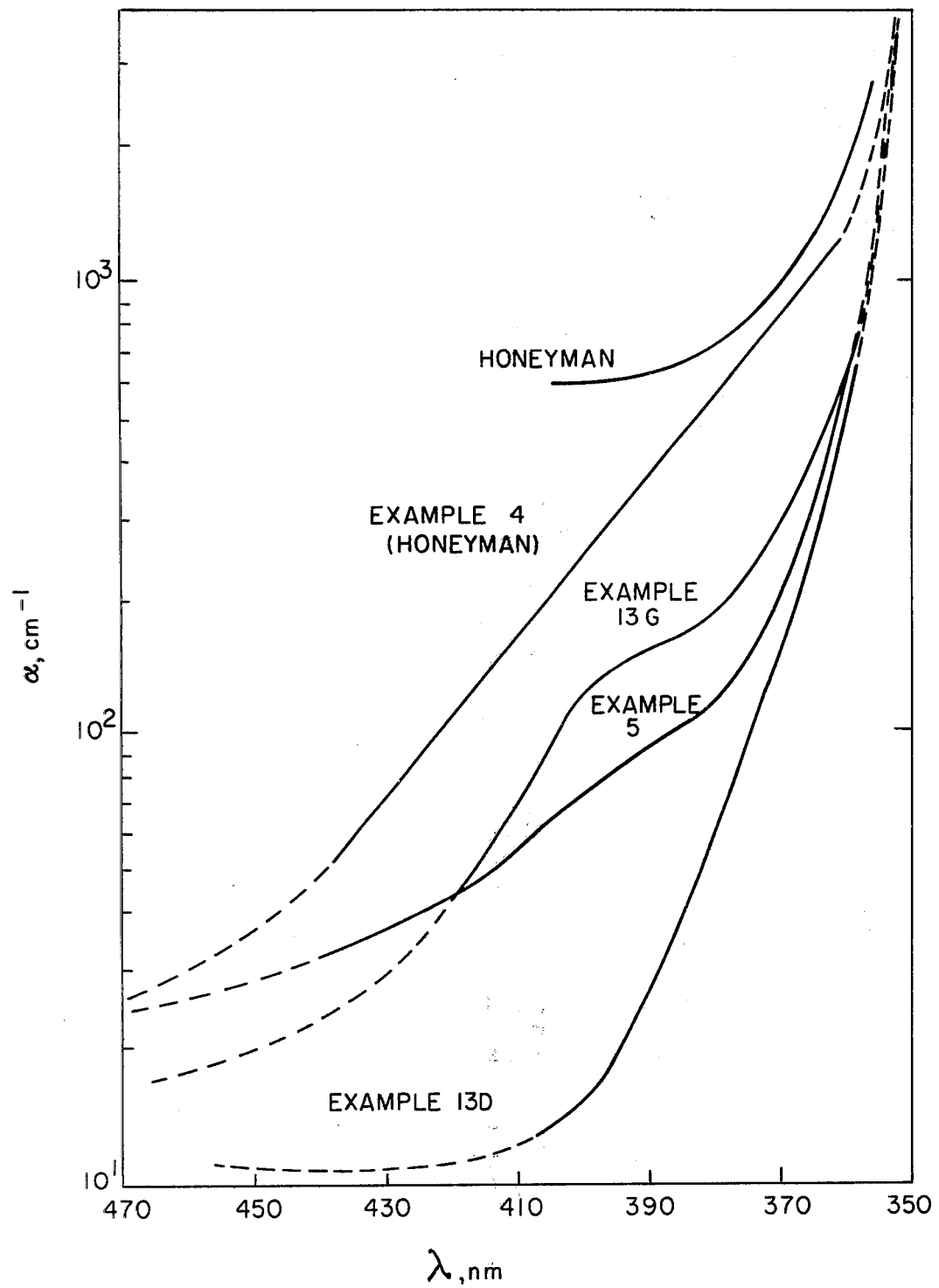

3,932,291

PREPARATION AND DOPING OF SEMICONDUCTING FORMS OF $CuAlS_2$

BACKGROUND OF THE INVENTION

1. Field of the Invention

This invention relates to new forms of semiconducting copper aluminum sulfide and their preparation.

2. Description of the Prior Art

Many compounds of type $ABX_2$ wherein A is a monovalent metal, B a trivalent metal, and X a chalcogen are known. In 1953 H. Hahn et al., Z Anorg. Allg. Chem. 271, 153 (1953) prepared the compounds $CuAlS_2$ and $CuAlTe_2$ among others and found that they had chalcopyrite-type structures and the space group $I\bar{4}2d$. The compounds were obtained by heating mixtures of CuX with the stoichiometrically required quantities of aluminum and chalcogen, and their homogeneity range seemed to be limited to stoichiometric compositions, C. H. L. Goodman and R. W. Douglas, Physica 20, 1107 (1954) noted structural analogy to chalcopyrite, $CuFeS_2$, and suggested that the compounds should be semiconductors; the energy gap of $CuAlS_2$ was calculated. C. H. L. Goodman, U.S. Pat. No. 2,814,004 (1957), prepared polycrystalline, semiconducting chalcogenides of formula $ABX_2$ by melting together in an inert atmosphere the theoretically required quantities of at least one of copper and silver with at least one of aluminum, gallium, indium, and thallium, and at least one of sulfur, selenium, and tellurium.

In 1969 W. N. Honeyman reported, J. Phys. Chem. Solids 30, 1935 (1969), growth of single crystals of semiconducting $CuAlS_2$ by vapor transport of the polycrystalline substances with iodine in vacuo in sealed tubes. Crystals of $CuAlS_2$ were dark green to black in color with an energy gap of 3.35 eV, a resistivity of $10^5$ to $10^7$ ohm-cm., and a negative Seebeck coefficient indicating n-type conductivity.

SUMMARY OF THE INVENTION

The invention comprises a semiconducting essentially colorless copper aluminum sulfide having chalcopyrite tetragonal structure containing up to 0.2% by weight of one or more ions of the group Cd, Hg, Zn, Si, Ge, Sn, Pb, Ga, In, Tl and Mn. They contain an excess of aluminum or a stoichiometric deficiency of copper or sulfur. The ratio of aluminum to copper lies between the range 1.001 and 1.01 and the ratio of sulfur to the sum of copper and aluminum lies between 0.975 and 0.995.

The compositions of the invention are p-type semiconductors when less than 0.02% by weight of the ions recited above are present and are n-type when there is more than 0.02% by weight of the ions present.

The sulfides of the invention have a light absorption coefficient less than $1.5 \times 10^2$ cm.$^{-1}$ at 4000 A. and have known chalcopyrite-type tetragonal structure with known space group $I\bar{4}2d$ and lattice constants $a = 5.330 \pm 0.005$ A. and $C = 10.417 \pm 0.020$ A. The compositions exhibit no electron spin resonance and are therefore deduced to contain less than 100 ppm of paramagnetic color producing ions.

When manganese is present the sulfide fluoresces in the yellow to red region of the spectrum when irradiated with ultraviolet light.

Essentially colorless p-type, semiconducting copper aluminum sulfide is prepared by heating together elementary copper, aluminum, and sulfur in a closed system in an inert atmosphere, preferably in an evacuated and sealed silica tube with halogen as a vapor transport agent. These elements are mixed utilizing atomic weight ratios of (1) 0.98–1.00 copper, 1.001–1.30 aluminum, and 1.95–2.0 sulfur, (2) 0.98–0.99 Cu, 1.0–1.30 Al, and 1.95–2.0 S, or (3) 1.00 Cu, 1.00 Al, and 1.95–1.99 S. These weight ratios correspond to use of a stoichiometric excess of aluminum or a stoichiometric deficiency of copper or sulfur, conditions required to impede the concentration of paramagnetic ions.

Doping is preferably effected by heating the copper aluminum chalcogenides with cadmium and aluminum with silicon present, in vacuo for up to about 24 hours at 300°–500°C. and then quenching.

The present invention further provides fluorescent and electroluminescent Mn-doped copper aluminum sulfide of formula $CuAlS_2$:Mn wherein Mn content is approximately 0.0036–0.72% by weight. These compositions are preferably made by heating mixtures of the elemental components in desired ratio or by heating preformed copper aluminum chalcogenides with elementary manganese or a manganese salt.

This invention still further provides a process for increasing the conductivity of p-type $CuAlS_2$ by heating the sulfide in air at about 100°–700°C. for periods of about 2 minutes to 2 hours or more. The crystals become darker as they are heated and the intensity of their electron spin resonance signal increases.

The compositions of the invention are prepared by heating in a closed system in the absence of air and at a temperature in the range of 900°–1250°C. for a period of 12 hours or more, a mixture which comprises copper, aluminum and sulfur, all of 99.999%, purity together with any of the desired dopant ions previously mentioned, the aluminum being in slight stoichiometric excess.

P-Type Semiconducting Copper Aluminum Sulfide

P-type semiconducting sulfides are produced when less than 0.02% by weight of the ions previously recited are present. When substantially free of color producing paramagnetic ions (less than 100 ppm paramagnetic ions of either $Cu^{+2}$, transition metal impurities, $Fe^{+3}$ or $Cr^{+3}$) as judged by absence of electron spin resonance, the $CuAlS_2$ of the invention is essentially colorless and has a light absorption coefficient as mentioned above. Presence of small quantities of impurities, well below the limits of conventional solution analytical chemistry, result in electron spin resonance and a dark green to black color. F. A. Cotton and G. Wilkinson in "Advanced Inorganic Chemistry," Interscience Publishers, 1962, page 515, report that electron spin resonance (ESR) is extremely sensitive, responding under optimum conditions to $10^{-5}$ paramagnetic species per liter. Thus extraordinarily low concentrations of paramagnetic ions can be detected. Electron spin resonance is observed when ions containing one or more unpaired electrons are placed in a magnetic field. Impurities such as $Fe^{+3}$, $Cr^{+3}$ or $Cu^{+2}$ could account for the ESR. For example, aluminum wire of 99.999% purity when utilized in the preparation of $CuAlS_2$ was found to contain 20–150 ppm $Cr^{+3}$ and 10–50 ppm $Fe^{+3}$. Thus when prepared by the procedures described in the art, $CuAlS_2$ containing these minute amounts of impurities is characterized by a dark green-black color, ESR is observed, and the compounds have a light transmission much less than that of the present compositions.

The color of CuAlS₂ obtained depends upon the Cu:Al:S ratio employed in the reactant mixture heated to produce the compound. Use of Cu:Al:S in exactly theoretical ratio, i.e. 1:1:2 atomic ratio, invariably results in highly colored CuAlS₂ containing traces of color producing paramagnetic ions detectable by ESR. Use of excess copper and/or sulfur or deficiency of aluminum, e.g. atomic ratios of 1:<1:2, likewise result in colored CuAlS₂. Essentially colorless CuAlS₂ is obtained when an excess of aluminum or a deficiency of sulfur or copper are used, i.e. by employing elementary reactants in the Cu:Al:S atomic ratios a. Cu = 0.98–1.0, Al = 1.001–1.30, S = 1.95–2.0
b. Cu = 0.98–0.99, Al = 1.0–1.3, S = 1.95–2.0
c. Cu = 1.0, Al = 1.0, S = 1.95–1.99

Relatively large excesses of aluminum do not result in a colored CuAlS₂. Excess aluminum and aluminum sulfide are readily extracted with dilute hydrochloric acid, leaving only analytically insignificant traces of aluminum. The use of the excess aluminum results, therefore, in a reduction of the color producing ions in CuAlS₂ allowing the formation of an essentially colorless material. Presumably the excess aluminum serves to reduce the color-forming ions such as $Fe^{+3}$, $Cr^{+3}$, and $Cu^{+2}$ to their less highly colored reduced form, $Fe^{+2}$, $Cr^{+2}$, and $Cu^{+}$.

An alternative way of producing essentially colorless copper aluminum sulfide is to anneal preformed colored CuAlS₂ with nontransition metal such as Mg, Zn, Cd, or Sn in an evacuated and sealed silica tube for about 2–48 hours at 600°C. or above. Below about 600°C., the product of such treatment is usually a light yellow.

Unlike CuAlS₂ of the art, the essentially colorless CuAlS₂ of this invention fluoresces (yellow-orange) when exposed to ultraviolet radiation.

It is preferred to use elementary reactants of the highest obtainable purity when preparing CuAlS₂, thus avoiding possible extraneous doping effects. Desirable reactants consist of copper and aluminum powders of 99.99% purity or copper and aluminum wires of 99.999% purity, both available from Electronics Space Products, Inc. or sulfur of 99.999% purity available from the American Smelting Co. Although aluminum powder is found to be 99.99% pure with respect to metal content by emission spectography, it has a high surface area and may have a correspondingly high oxygen content. For this reason it is preferred to use aluminum wire rather than aluminum powder as a reactant.

Cuprous sulfide and aluminum sulfide along with requisite quantities of elementary components can be used as reactants, but it is preferred to use mixtures of metals and sulfur as reactants since both Cu₂S and Al₂S₃ are difficult to prepare and keep in pure form.

Reaction is effected in the absence of air. The composition of the reaction vessel is selected so as to give a minimum contamination of the copper aluminum chalcogenides. The reaction may be carried out in evacuated and sealed silica tubes about ½-inch inside diameter and 6 inches in length. The temperature is raised slowly to allow aluminum to react with copper and sulfur rather than with the silica tube and to avoid explosion of the tube by the pressure of unreacted sulfur. The possibility of explosion may be reduced and vapor phase crystal growth made possible by employing a silica tube in which the end of the tube containing the reactants is heated to a higher temperature than the other end by, for example, surrounding the reaction tube with a tube furnace in which there is a natural or designed temperature gradient. Essentially all the sulfur charged reacts in about 24–48 hours.

Reaction with silica may also be reduced by placing the reactants in an alumina crucible or on graphite which itself is then placed in the silica tube which is evacuated, sealed and heated as described.

Reaction may be brought about by slowly raising the temperature of the charged, evacuated, and sealed reaction tube to about 900°–1250°C. and maintaining the temperature for about 12 hours or more. Preferably, however, the tube is heated for about 24–48 hours with the end containing the reactants at 800°–1000°C. and the cooler end at 400°–800°C. The tube may then be removed from the furnace, shaken to mix the reactants, and reheated to complete the reaction. If desired the tube may be cooled after preliminary reaction and its contents may be removed and intimately mixed by grinding, e.g. with agate mortar and pestle. The thoroughly mixed charge may then be resealed in vacuo, and firing continued at about 1000°–1250°C. for several days to insure complete reaction.

Growth of crystals and rate of reaction are enhanced by employing small quantities of halogen, e.g. about 3% by weight of iodine based on the weight of the charge, as a vapor transport agent. The products frequently consist of discrete single crystals ranging from a few tenths of a millimeter to several millimeters in length.

N-TYPE COPPER ALUMINUM SULFIDE p-Type copper aluminum sulfide, CuAlS₂, of this invention may be converted from p- to n-type by heating it at about 300°–600°C. for about 2 to 48 hours or more in evacuated silica tubes in the presence of small amounts of preferably cadmium and aluminum, tin, silicon or germanium; or cadmium, mercury or zinc and aluminum, gallium, indium, silicon, germanium, tin and lead. The quantity of dopants incorporated into the chalcogenide is readily determined by emission spectroscopy.

Although the method of doping described involves heating preformed copper aluminum sulfide with elemental forms of dopant metals, the invention is not limited to this method of incorporation. alternatively, dopant metals may be incorporated in synthesis mixtures, the dopant replacing a corresponding quantity of copper, with synthesis then being carried out in normal manner.

Doped copper aluminum sulfide may be rapidly cooled (quenched) from reaction temperature to room temperature to minimize diffusion and segregation of dopant on cooling.

MANGNESE-DOPED COPPER ALUMINUM SULFIDE

Undoped copper aluminum sulfide fluoresces dully (yellow-orange) at room temperature when exposed to ultraviolet light. Fluorescence of the sulfide is considerably enhanced by doping it with small quantities of manganese.

The quantity of Mn introduced may be estimated by emission spectroscopy, but it is not clear nor, indeed, is it material to the invention, to known whether the manganese replaces copper or aluminum in the sulfide crystal lattice. The invention provides manganese-doped copper aluminum sulfide which is fluorescent and electroluminescent in which 0.01–2 atom percent of the copper and/or aluminum therein has been displaced with an equiatomic quantity of manganese. The Mn-doped sulfide can be formulated as $CuAlS_2$:Mn wherein Mn-content is approximately 0.0036–0.72% by weight.

One method of preparing manganese-doped copper aluminum sulfides involves substituting an equiatomic quantity of Mn for an equiatomic quantity of Cu or Al in the normal synthesis mixture, reaction then being effected as described. Iodine may be employed as a vapor transport agent and the evacuated and sealed tubular reactor may be heated at about 800°–1000°C. in the hotter end and about 300°–800°C. in the cooler end for about 24–72 hours or more. Alternatively, previously prepared copper aluminum sulfide may be heated with manganese in evacuated and sealed tubes in the manner described for doping with cadmium. Another effective method of doping is to heat crystals of copper aluminum sulfide with $MnCl_2$ and NaCl. The NaCl acts as a flux, promoting diffusion of manganese into the lattice. It is convenient to use the more readily available hydrated $MnCl_2.4H_2O$ rather than $MnCl_2$ and to evacuate and warm the reaction mixture to expel water of hydration before sealing the tube and heating it for about 1 hour at 800°–900°C. to effect doping. The doped material may be washed with water to remove salts.

In addition to elementary manganese and manganese (II) chloride, other manganese compounds such as MnS, $MnS_2$, $MnBr_2$, and $MnI_2$, may be used as sources of manganese.

The response of Mn-doped copper aluminum sulfide produced in Examples 10 and 11 to ultraviolet radiation and to simulated cathode ray irradiation and its electroluminescence in a 7 kc field is shown in Table I.

TABLE I

| | Produced in Example 10 | Produced in Example 11 |
|---|---|---|
| Fluorescence excited by 3650A uv light | Orange [2] | Orange-yellow [2] |
| Fluorescent excited by 2537A uv light | Orange [3] | Orange-yellow [2] |
| Fluorescence excited by simulated cathode rays [1] | Orange [3] | — |
| Electroluminescence [4], color | Orange | Orange-yellow |

[1] Crude test involving exposure of sample to low voltage ions produced in a gaseous glow discharge tube.
[2] Bright to dark adapted eye
[3] Less than (2) but easily visible to dark adapted eye
[4] Field of 7 kc, 5×10⁵ volts/cm. max.

INCREASE IN CONDUCTIVITY UPON HEATING IN AIR

As illustrated in Example 12 the p-type conductivity of both colorless and colored $CuAlS_2$ may be materially increased by simply heating crystals of the sulfides in air between about 100° and 700°C. for a few minutes to a few hours. The products increase in oxygen content and the crystals darken in color with proportionate increase in electron spin resonance signal, thus indicating oxidation of color producing ions, e.g., $Cu^{1+}$ to $Cu^{2+}$, $Fe^{+2}$ to $Fe^{+3}$.

SPECIFIC EMBODIMENTS OF THE INVENTION

There follow some non-limiting examples illustrating embodiments of the invention. In these examples reaction tubes were usually about ½-inch in diameter by about 6 inches in length.

Examples 1, 2, and 3 illustrate the preparation of essentially colorless p-type copper aluminum sulfide. As contrasted to the stoichiometric formula $CuAlS_2$, Example 1 involves use of excess Al, Example 2 uses a deficiency of copper and an excess of Al, and Example 3 uses a deficiency of sulfur.

EXAMPLE 1 p-Type Copper Aluminum Sulfide

Essentially colorless copper aluminum sulfide was obtained by reaction of copper, aluminum, and sulfur powders in 1.00:1.10:2.00 atomic weight ratio. That is, a 1.5 gram mixture of 0.009533 g atom of Cu, 0.01048 g atom of Al, 0.01906 g atom of S and about 0.05 g of iodine were sealed in an evacuated ½-inch by 6-inch silica tube, and the tube was heated to 1000°C. in about 6 hours in a tube furnace, held at this temperature for 48 hours and cooled. The tube was opened and the mixture of white and orange solids was reground and resealed in vacuo and reheated at 1000°C. for an additional 48 hours. The color of the product was now white. It was further heated to 1175°C. and gradually cooled to room temperature over a period of 48 hours. The final product consisted of a mixture of yellow and colorless crystals in the hot zone and flake-like, white unidentified material on the tube walls. The colorless crystals were separated manually. Their Debye-Scherrer x-ray powder diffraction pattern reproduced that reported in the literature for $CuAlS_2$. Cell dimensions were $a$=5.328±0.001A and $c$=10.398±0.001A.

EXAMPLE 2 p-Type Copper Aluminum Sulfide

A 1.5 gram mixture of copper wire, aluminum wire and sulfur powder in the atomic weight ratio 0.99:1.01:2.00 and 0.05 g of iodine were sealed under vacuum in a silica tube and heated in a tube furnace for about 96 hours with the end containing the reactants at 900°C. and the other end at 400°C. The product consisted of clear white crystals which fluoresced yellow-orange when exposed to ultraviolet radiation. The Debye-Scherrer x-ray powder pattern was typical of that described in the literature for $CuAlS_2$. Lattice constants were: $a$=5.331 + 0.001A and $c$=10.430 ± 0.001A. The resistivity, $\rho 298°K$ (2 probe), was 8.55 × $10^3$ ohm-cm. The Seebeck coefficient of +46 microvolts per degree (uv/°) indicated p-type conductivity.

EXAMPLE 3 p-Type Copper Aluminum Sulfide

Copper wire, aluminum wire, and sulfur in 1:1:1.95 atomic weight ratio (total weight of 1.5 grams) and 0.05 g. iodine were sealed under vacuum and heated for 48 hours in a silica tube with the end containing the reactants at 950°C. and the other end at 500°C. The temperature of the cooler end was then raised to 800°C. and held there for about 72 hours. The product was pure white and crystalline. Its lattice constants by x-ray powder methods were a=5.334 ± 0.002A and c=10.435 ± 0.004A. Resistivity measurements showed that the copper aluminum sulfide was a p-type conductor with resistivity of $\rho 298°K$ = 8.4 × $10^2$ ohm-cm and a thermoelectric power of +21 $\mu v/°$. Emission spectroscopy showed the presence of 0.2–1.0% Si, 5–25 ppm Fe, and 10–50 ppm Cr and Ti.

The essentially colorless crystals of the $CuAlS_2$ prepared by the process of the present invention may be readily distinguished from the green-black crystals of $CuAlS_2$ prepared by processes known to the art by the percent light transmission, especially in the blue region (400 nm). It is the transmission in this region which imparts the colorless quality. Examples 4 and 5 illustrate the differences in % light transmission between the green-black crystals of the art (Example 4) and the essentially colorless crystals of the present invention (Example 5).

EXAMPLE 4

Absorption Coefficient at 400 nm of Colored p-type $CuAlS_2$ Prepared by Known Method (Honeyman)

$CuAlS_2$ crystals were prepared by sealing 2.0544 g (0.3233 g atom) of copper wire, 0.8723 g (0.3233 g atom) of aluminum wire, 2.073 g (0.6465 g atom) of sulfur — all of 99.999% purity —, and 5 mg iodine/cm$^3$ in an evacuated silica tube. It was heated slowly over about a two day period initially to 800°C in the hot region and 500°C in the cool region. After 1 day it was cooled, shaken and reheated at 850°C in the hot region and 730°C in the cool region. Large green crystals formed after about 2 days.

Polished crystals of this material were tested for % light transmission. The absorption coefficient at 400 nm was $2.5 \times 10^2$ cm$^{-1}$. The absorption coefficient vs. wave length is shown in the Figure.

EXAMPLE 5

Absorption Coefficient at 400 nm of Essentially Colorless p-Type $CuAlS_2$ Prepared by Process of Present Invention 2.0525 g (0.3229 g atom) of copper wire, 0.8759 g (0.3246 g atom) aluminum wire, 2.0716 g (0.646 g atom) of sulfur — all 99.999% purity —, and 5 mg iodine/cm$^3$ were sealed in an evacuated silica tube and heated over about 2 days. Initially the tube was heated to 800°C in the hot region and 500°C in the cool zone. After about 1 day the tube was cooled, shaken and reheated at 850°C in the hot zone and 800°C in the cool zone. Essentially colorless crystals were obtained.

One of the crystals obtained was mounted and polished and the % light transmission measured on a Cary 14 Spectrophotometer. The absorption coefficient at 400 nm. was $7.5 \times 10^1$ cm$^{-1}$. The Figure illustrates the differences in absorption coefficients between the essentially colorless $CuAlS_2$ crystals characteristic of the present invention and the colored crystals of $CuAlS_2$ prepared by prior art methods over a wavelength range of 350–470 nm.

EXAMPLE 6

Conversion of Copper Aluminum Sulfide from p-Type to n-Type

Copper aluminum sulfide may be converted from p-type to n-type conductivity by annealing it with cadmium containing Si and Sn.

p-Type copper aluminum sulfide was prepared by placing powdered copper, aluminum, and sulfur in 1:1:2 atomic weight ratio (total weight of 1.000 gram) and 0.05 g iodine in a dried alumina crucible which was sealed under vacuum in a silica tube. Temperature was raised to 1100°C. in about 6 hours and maintained there for about 24 hours. The product was removed at room temperature.

A green crystal several millimeters in size of this p-type $CuAlS_2$ was heated in an evacuated and sealed silica tube with a 50 milligram chunk of cadmium for 24 hours at 400°C and then quenched in a water bath to minimize diffusion of Cd on cooling. In addition to the cadmium, Si and Sn were also present. The product was yellow in color and electrical measurements showed n-type conductivity: $\rho 298°K = 2.0 \times 10^4$ ohm-cm; $-154$ $\mu v/°$. Emission spectroscopy showed the presence of 500–2500 ppm of Cd, Si, and Sn, 10–50 ppm Fe, and 5–25 ppm Ni and Ag.

EXAMPLE 7

Conversion of Copper Aluminum Sulfide from p-type to n-type

Green crystals of p-type $CuAlS_2$, such as produced in Example 6, were sealed in a silica tube with a small piece of cadmium and tin and heated at 610°C. for 48 hrs. and quenched in a water bath. Some of the crystals were honey colored and some gray. A honey colored crystal was polished on one side to expose the inner region of the crystal. Indium contacts were applied to the outer and inner regions. Diode characteristics were observed indicating the presence of a p,n junction in which the outer region of the crystal was n-type.

Examples 8–11 inclusive show doping of copper aluminum sulfide with manganese to give compositions that fluoresce brightly in the orange region of the spectrum when irradiated with ultraviolet light.

EXAMPLE 8

Mn-Doped Copper Aluminum Sulfide

A 0.49 gram mixture of Cu, Mn, Al, and S powders in 0.96:0.02:1:2 atomic weight ratio and 0.05 g of iodine were sealed under vacuum in a silica tube and heated for about 48 hours with the end containing the reactants at 900°C. and the cooler end at 300°C. The resulting large colorless crystals fluoresced in the orange when exposed to ultraviolet light (Table I) and they were electroluminescent.

EXAMPLE 9

Mn-Doped Copper Aluminum Sulfide

A mixture of 0.3 g of colorless copper aluminum sulfide corresponding in composition to $CuAlS_{1.95}$ (produced in Example 3), 0.009 g NaCl, and 0.024 g $MnCl_2.4H_2O$ was placed in a silica tube. The tube was evacuated and warmed to drive off water of hydration. The evacuated tube was then sealed and heated at 820°C. for ½ hour. The product was cooled to room temperature and washed with water and with acetone. The resulting light-brown manganese-doped crystals fluoresced in the orange when exposed to ultraviolet light. Emissivity peaked at a wavelength of 625 millimicrons.

EXAMPLE 10

Mn-Doped Copper Aluminum Sulfide

A 1.000 gram mixture of Cu, Mn, Al, and S in 0.995:0.005:1:2 atomic ratio by weight and 0.050 g of iodine were sealed under vacuum in a silica tube of about 15 ml. capacity and heated for about 48 hours with the hot end of the tube at 800°C. and the cool end at 600°C. The tube was shaken and reheated for about 72 hours with temperatures of 950°C. in the hot zone and 800°C. in the cool zone. The product, which consisted primarily of white crystalline material found in the hot zone, fluoresced in the yellow-orange when exposed to ultraviolet radiation.

EXAMPLE 11

Mn-Doped Copper Aluminum Sulfide

A 1.000 gram mixture of Cu, Al, Mn, and S in 1:0.995:0.005:2 atomic ratio was sealed in vacuo with about 0.05 gram of iodine in a 15 ml capacity silica tube. The heating cycle duplicated that of Example 10. The product consisted of white microcrystalline material which fluoresced bright red-orange in ultraviolet light.

Example 12 shows that the resistivity of p-type copper aluminum sulfide may be lowered by simply heating it briefly in air.

EXAMPLE 12

Doping by Heating in Air

Copper aluminum sulfide was prepared by heating copper, aluminum, and sulfur in 1:1.05:2 atomic weight ratio (1.000 grams) with 2 drops of bromine in an evacuated and sealed 15-ml silica tube at 800°C., (hot zone), 300°C. (cool zone) for 2 days, then at 950°C. (hot zone), 600°C. (cool zone) for 2 more days. The product was further heated at 1100°C. (hot zone) and 900°C. (cool zone) for 2 days. The product consisted of light yellow crystals which showed p-type conduction ($\rho = 3.1 \times 10^2$ ohm cm; +9 $\mu$v/°).

Some of the crystals were heated in air for 10 minutes at 600°C. and quenched. Resistivity was decreased to 20 ohm-cm (Seebeck-coefficient, +6 $\mu$v/°).

EXAMPLE 13

Electron Spin Resonance Data

Electron spin resonance (ESR) data may be used to demonstrate that color in $CuAlS_2$ is apparently caused by concentrations of paramagnetic transition metal ions in concentrations so small that their presence cannot be demonstrated by conventional x-ray or solution analytical techniques. Emission spectroscopy typically shows from 10–50 ppm Cr and Fe in most samples. The correlation between the color of copper aluminum sulfide and its epectron spin resonance is illustrated in this example.

Part A

Essentially colorless copper aluminum sulfide (p-type) was prepared from high purity elemental reactants used in the atomic ratio theoretically required for $CuAl_{1.01}S_2$. The reactants which weighed a total of 15.0 grams, were sealed in vacuo with iodine (5 mg/cc of tube volume) in a silica tube and heated in about 6 hours to 900°C. (hot end containing the reactants) and 600°C. in the cool end. After 48 hours at this temperature, the tube was shaken to mix the reactants and heating was continued for 2 weeks with the hot zone at 900°C. and the cooler zone at 700°C. The product consisted of colorless $CuAlS_2$ containing by x-ray analysis by-product Al, $Al_2S_3$, and $Cu_2S$. By-product Al and $Al_2S_3$ were extracted by washing with hydrochloric acid followed by acetone. The washed product gave no electron spin resonance spectrum.

Anal. Calcd for $CuAlS_2$; Cu, 41.09; Al, 17.44; S, 41.47; Si, 0.00. Found: Cu, 41.04; Al, 16.97; S, 41.46; Si, 0.13. The Si probably originated from the reaction tube.

Part B

A portion of the above washed product still containing black flecks, which by x-ray examination were $Cu_2S$, was sealed in an evacuated silica tube and heated for 72 hours at 1000°C. The product became green and exhibited an ESR spectrum.

Anal. Found: Cu, 41.0; Al, 17.14; S, 42.59; Si, 0.01–0.05%; Fe, 20–100 ppm; Ge,Sn,Mg 50–250 ppm; Pb,B,Ag 50–100 ppm.

Part C

Green crystals from Part B were sealed in vacuo with a small chunk of aluminum and heated for 16 hours at 500°C. and quenched. The resulting light yellow crystals gave no ESR spectrum, indicating that the paramagnetic ion which had given rise to both resonance green color had been reduced by diffusion of aluminum into the crystal.

Part D

Green crystals from Part B were heated in vacuo as described in Part C above but in the presence of small pieces of aluminum and cadmium. Again, the crystals became light yellow in color and no longer exhibited electron spin resonance.

Part E

Green crystals from Part B were heated in air in a silica tube for 10 minutes at 500°C. and quenched. The crystals darkened in color and gave a strong ESR spectrum.

Part F

Green crystals from Part B were heated in air in a silica tube for 45 minutes at 600°C. and quenched. The crystals became dark in color and showed an enhanced ESR spectrum. The increase in color and the enhancement of electron spin resonance is attributed to oxidation of $Fe^{+2}$ and $Cr^{+2}$ to trivalent ESR active states or diamagnetic $Cu^{1+}$ to paramagnetic $Cu^{2+}$, C.

Part G

Green crystals from Part B were heated in an evacuated sealed silica tube with ~0.05 g Si powder at 500°C. for 16 hours and quenched. The crystals became light yellow and showed no ESR spectrum.

The colorless quality of the material produced according to this invention in comparison to the material of the art (Honeyman and material prepared according to Honeyman's method, Example 4) is illustrated by optical absorption measurements made on polished crystals from Examples 4, 5, 13D and 13G using a Cary 14 Spectrophotometer. The percent of the light transmitted vs. wavelengths between 470 and 350 nm was measured. In order to quantitatively compare the results, absorption coefficients were calculated for several wavelengths. The absorption coefficient is described in *Principles of Optics* by M. Born and E. Wolf, Pergamon Press 3rd Ed., p. 614 and is inversely proportional to the penetration depth of light in a crystal. The results shown in the FIGURE illustrate the lower absorption coefficients of the materials of this invention.

The top curve is the data reported by Honeyman. the curve below it is data from green crystals of Example 4 prepared according to Honeyman's method. In comparison, the curve for the material of Example 5 lies well below, indicating greater degree of transparency of the colorless material. These sulfides were prepared from the same starting materials but the green sulfide was prepared from a stoichiometric ratio (as was Honeyman's) while the colorless sulfide was prepared using an excess of aluminum.

The curves for Examples 13D and 13G illustrate the quality of the material produced by heating green crystals in the presence of dopant metals, in these cases Si and Cd/Al. Although a pale yellow color is imparted, the crystals are essentially colorless and their absorption coefficients are low.

The absorption coefficients at 400 nm were chosen as points of comparison since 400 nm is at the beginning of the visible spectrum in the blue.

The utility of the sulfides of this invention arises primarily from their semiconducting and optical properties. Thus they may be used in any of the more common semiconductor devices such as thermistors, photoconductors, thermoelectrics, etc. Since they may be n-type or p-type, diodes may be fabricated using partly n-type and partly p-type material. Diodes are useful in rectifiers; transistors and electroluminescence. The Mn-doped compositions are useful in typical applications of fluorescent materials such as fluorescent lighting, cathode ray tubes, etc. A colorless material has obvious advantages over a black or green material. Additionally, it has been found that essentially colorless $CuAlS_2$ exhibits a fluorescence stimulatable by infrared.

EXAMPLE A

The positive Seebeck coefficient of $+46\mu v/°$ and the resistivity of $8.55 \times 10^3$ ohm-cm of the essentially colorless copper aluminum sulfide produced in Example 2 show that the material may be used as a thermoelectric unit. Thus a voltage was generated by attaching wires to ends of a crystal by means of silver paste and then heating only one side of the crystal.

The copper aluminum sulfide of Example 3 and the Mn-doped $CuAlS_2$ of Example 12 exhibited electroluminescence easily visible to the dark adapted eye when samples of the powdered material were suspended in a 1 mil thick layer of beeswax between a coin silver plate and a 1 mil thick mica sheet. A small puddle of salt water on the mica served as the second and transparent electrode. Orange electroluminescence became visible when an alternating field of about $2 \times 10^5$ volt/centimeters was applied.

The copper aluminum sulfide of Example 3 fluoresced visibly in the orange when exposed to ultraviolet radiation of 3650 and 2537A wavelength.

EXAMPLE B

The phenomenon of IR stimulated luminescence was observed in many samples of $CuAlS_2$. Powdered samples were mounted on slides and exposed to u.v. radiation. They were then stimulated using a neodymium glass laser (emission of 1.06 $\mu$) and the stimulated luminescence was observed with a photomultiplier tube and displayed on a ocilloscope. The procedure was performed on:
 1. $CuAlS_2$ (50 $\mu$ particle) — colorless
 2. $CuAlS_2$ (150 particle) — colorless
 3. $CuAlS_2$:Al (Example 13 - Part A) — colorless
 4. $CuAlS_2$:Cu/Al (Example 13 - Part B) — colored
 5. $CuAlS_2$:air (Example 13 - Part E) — colored The effect was strongest for the colorless (1–3) samples and for the larger particles (2). This effect may be used in I.R. detection or on a means for information storage and retrieval.

The embodiments of the invention in which an exclusive property or privilege is claimed are defined as follows:

1. A semiconducting essentially colorless copper aluminum sulfide having chalcopyrite tetragonal structure having a light absorption coefficient less than $1.5 \times 10^2$ cm$^{+1}$ at 4000A consisting of copper, aluminum and sulfur wherein the ratio of aluminum to copper lies between the range 1.001 and 1.01 and the ratio of sulfur to the sum of copper and aluminum lies between 0.975 and 0.995.

2. A process for producing a semiconducting essentially colorless copper aluminum sulfide having chalcopyrite tetragonal structure and a light absorption coefficient less than $1.5 \times 10^2$ cm.$^{+1}$ at 4000A which comprises heating in a closed system in the absence of air at a temperature range of 900°–1250°C. for 12 hours or more a mixture of elemental copper, aluminum and sulfur all of 99.999% purity in atomic weight ratios
 a. Cu=0.98–1.0, Al=1.001–1.30, S=1.95–2.0;
 b. Cu=0.98–0.99, Al=1.0–1.30, S=1.95–2.0; or
 c. Cu=1.00, Al=1.00, S=1.95–1.99.

3. A process of claim 2 in which iodine is used as a vapor transport agent.

4. A process according to claim 2 wherein the atomic weight ratio is 0.98–1.00 copper, 1.001–1.30 aluminum and 1.95–2.0 sulfur.

5. A process according to claim 2 wherein the atomic weight ratio is 0.98–0.99 copper, 1.0–1.30 aluminum and 1.95–2.0 sulfur.

6. A process according to claim 2 wherein the atomic weight ratio is 1.0 copper, 1.0 aluminum and 1.95–1.99 sulfur.

* * * * *